United States Patent [19]

Koike et al.

[11] Patent Number: 4,969,951
[45] Date of Patent: Nov. 13, 1990

[54] CLOTH JET PRINTING METHOD USING AQUEOUS INK HAVING HYDROXYL OR AMINO-REACTIVE DISPERSE DYE

[75] Inventors: Shoji Koike; Kazuo Iwata, both of Yokohama, Japan

[73] Assignee: Canon Kabushiki Kaisha, Tokyo, Japan

[21] Appl. No.: 173,036

[22] Filed: Mar. 24, 1988

Related U.S. Application Data

[62] Division of Ser. No. 864,150, May 16, 1986.

[30] Foreign Application Priority Data

| May 21, 1985 | [JP] | Japan | 60-106985 |
| May 21, 1985 | [JP] | Japan | 60-106986 |
| May 21, 1985 | [JP] | Japan | 60-106987 |
| May 21, 1985 | [JP] | Japan | 60-106988 |
| May 28, 1985 | [JP] | Japan | 60-113293 |

[51] Int. Cl.$^5$ ............................................. C09D 11/02
[52] U.S. Cl. ........................................ 106/22; 106/20; 106/23; 346/1.1
[58] Field of Search ................................ 106/20, 22, 23; 346/1.1

[56] References Cited

U.S. PATENT DOCUMENTS

| 4,166,044 | 8/1979 | Germonprez et al. | 106/22 |
| 4,239,544 | 12/1980 | Strem | 106/22 |
| 4,471,079 | 9/1984 | Enami | 523/61 |
| 4,689,078 | 8/1987 | Koike et al. | 106/22 |

FOREIGN PATENT DOCUMENTS

0083267 4/1986 Japan .

OTHER PUBLICATIONS

Derwent Abstract Accession No. 82-06709e/04, Japanese Patent No. J56161193, Dec. 11, 1981.
Derwent Abstract Accession No. 82-05213j/49, Japanese Patent No. J57174360, Oct. 27, 1982.
Hawley: The Condensed Chemical Dictionary, 8th Ed., (1971), 338.
Derwent Abstract Accession No. 84-316404/51, Japanese Patent No. J59199781, Nov. 12, 1984.
Derwent Abstract Accession No. 84-072546/12, Japanese Patent No. J59027973, Feb. 14, 1984.
Derwent Abstract Accession No. 83-774216/39, Japanese Patent No. J58141257, Aug. 22, 1983.
Derwent Abstract Accession No. 82-05213J/49, Japanese Patent No. 57174360, Oct. 27, 1982.
Derwent Abstract Accession No. 82-06709e.04, Japanese Patent No. J56161193, Dec. 11, 1981.
Derwent Abstract Accession No. 68-389480/00, Netherlands Patent No. NL6906529, Jan. 1968.
Derwent Abstract Accession No. 74-60471v/34, Japanese Pat. No. J48091385, Nov. 1973.
Derwent Abstract Accession No. 75-73179w/44, Japanese Patent No. J50059108, May 22, 1975.

*Primary Examiner*—Amelia Burgess Yarbrough
*Attorney, Agent, or Firm*—Fitzpatrick, Cella, Harper & Scinto

[57] ABSTRACT

A liquid composition for ink jet printing is provided which comprises a reactive disperse dye dispersed or dissolved in an aqueous liquid medium. An ink jet printing method is also provided which includes imparting the above-mentioned liquid composition onto a cloth according to an ink jet system and fixing of the dye on the cloth.

9 Claims, No Drawings

CLOTH JET PRINTING METHOD USING AQUEOUS INK HAVING HYDROXYL OR AMINO-REACTIVE DISPERSE DYE

This application is a division of application Ser. No. 864,150 filed May 6, 1986, now abandoned.

BACKGROUND OF THE INVENTION

1. Field of the Invention

This invention relates to a liquid composition for ink jet printing, particularly a liquid composition suitable for printing of mixed woven fabrics or mixed nonwoven fabrics comprising readily dyeable reactive fibers such as cotton, hemp, viscose, wool, silk, nylon, etc, and less dyeable nonreactive fibers such as polyester or acetate, and an ink jet printing method by used thereof.

2. Description of the Prior Art

In the prior art, for printing of mixed woven fabrics comprising readily dyeable reactive fibers such as cotton, hemp, viscose, wool, silk, nylon, etc. and less dyeable nonreactive fibers such as polyester or acetate, there have been employed printing methods such as roller printing, screen printing, transfer printing, etc. in which a formulated dye of a reactive dye (or a threne dye) and a disperse dye is used. Also, separately, the printing method by ink jet system has been proposed. And, in practicing the printing method by this ink jet system, considerable technical difficulty has been accompanied in finely dispersing the formulated dye uniformly into the liquid composition for printing. At the same time, particularly the formation ratio of the dyes in the droplets discharged from the ink jet nozzle cannot be kept constant, and therefore in the dye fixing treatment after printing, there ensues frequently the problem that variation in concentration occurred in dyeing to give non-uniform dyed product without color regularity. Thus, this technique has not been easily practiced.

SUMMARY OF THE INVENTION

Accordingly, an object of the present invention is to provide a liquid composition for printing which can be applied to the printing method according to the ink jet system to realize a print of good quality.

Another object of the present invention is to provide an ink jet printing method improved so as to give a uniform dyed product without color irregularity.

The present invention accomplishing these objects provides, in one aspect, a liquid composition for ink jet printing comprising a reactive disperse dye dispersed or dissolved in an aqueous liquid medium and, in another aspect, an ink jet printing method by imparting a liquid composition onto a cloth according to the ink jet system and then subjecting the cloth to dye fixing treatment, said liquid composition comprising a reactive disperse dye dispersed or dissolved in an aqueous liquid medium.

DETAILED DESCRIPTION OF PREFERRED EMBODIMENTS

To describe in more detail about the present invention, the constitution which charactersizes first the present invention is used of a reactive disperse dye as the colorant of the liquid composition for ink jet printing.

The reactive disperse dyes to be used in the present invention refer to a slightly water-soluble azo type, anthraquinone type or other types of dyes used sometimes in printing of, for example, polyester/cotton mixed woven fabrics of the prior art. These reactive disperse dyes have molecular weights within a certain limited range, and also have no water-soluble group such as sulfonic acid group or carboxylic group in their structures, and also have groups which can react with hydroxyl or amino groups of the fibers to form covalent bonds with fibers, such as an ethyleneimine group, an azide group, a sulfonethyleneimine group, a dichlorotriazine group, a monochlorotriazine group, a trichloropyrimidine group, a monochlorodifluoropyrimidine group, a chlorobenzothiazole group, a dichloropyridazone group, a dichloropyridazine group, a dichloroquinoxaline group, an epoxy group, a 3-carboxypyridiniotriazine group, and the groups of
$SO_2CH_2CH_2OSO_3H$,
$SO_2NHCH_2CH_2OSO_3H$,
$NHCOCH_2CH_2OSO_3H$,
$NHCOCH_2CH_2Cl$,
$NHCOCH=CH_2$,
$SO_2CH=CH_2$,
$CH_2NHCOCCl=CH_2$,
$NHCOCBr=CH_2$,
$NOCOCH_2Cl$,
$NHCH_2OH$, $-PO_3H$,
$SO_2CH_2CH_2OCOCH_3$,
$SO_2CH_2CH_2OCOOC_4H_9$, etc.

Among them, examples of preferable reactive disperse dyes in the present invention include those represented by the formulas shown below.

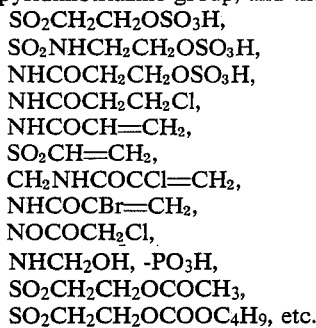

(1)

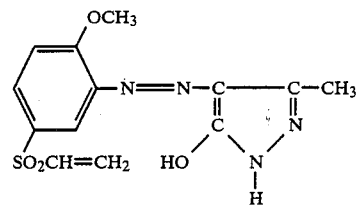

(2)

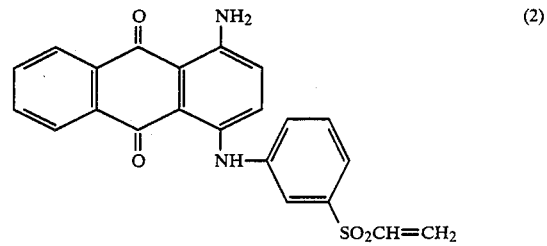

(3)

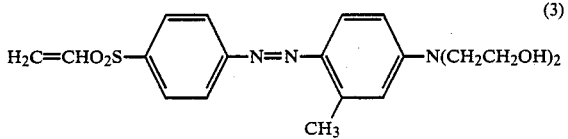

(4)

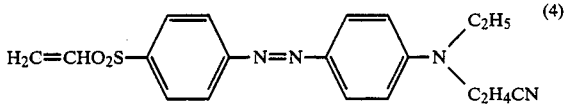

(5)

-continued

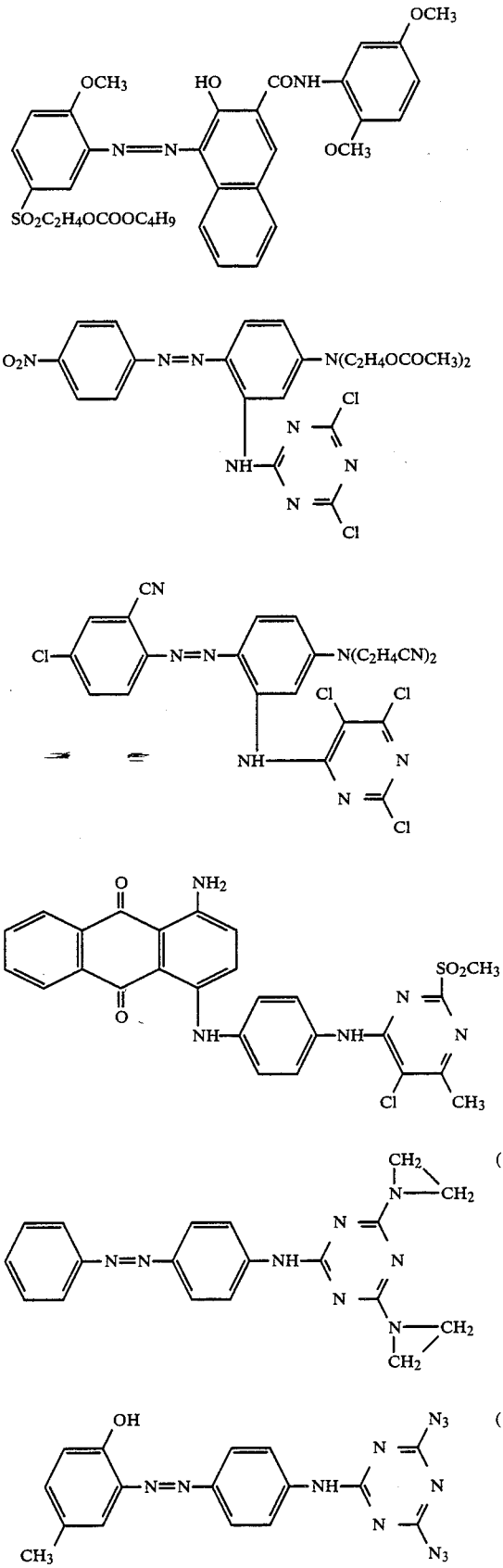

-continued

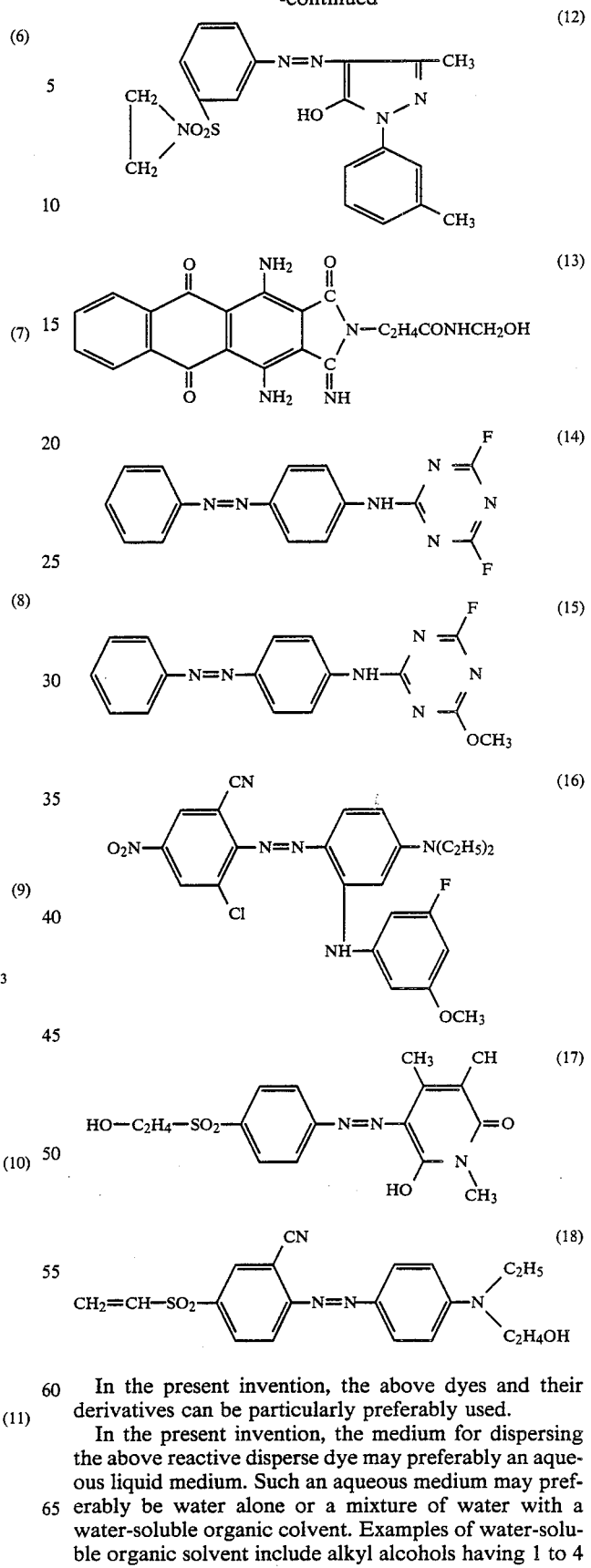

In the present invention, the above dyes and their derivatives can be particularly preferably used.

In the present invention, the medium for dispersing the above reactive disperse dye may preferably an aqueous liquid medium. Such an aqueous medium may preferably be water alone or a mixture of water with a water-soluble organic colvent. Examples of water-soluble organic solvent include alkyl alcohols having 1 to 4 carbon atoms such as methyl alcohol, ethyl alcohol, n-propyl alcohol, isopropyl alcohol, n-butyl alcohol, sec-butyl alcohol, tert-butyl alcohol, isobutyl alcohol and the like; amides such as dimethylformamide, dimethylacetamide and the like; ketones or ketoalcohols such as acetone, diacetone alcohol and the like; ethers such as tetrahydrofuran, dioxane and the like; polyalkylene glycols such as polyethylene glycol, polypropylene glycol and the like; alkylene glycols of which alkylene group contains 2 to 6 carbon atoms such as ethylene glycol, propylene glycol, butylene glycol, triethylene glycol, 1,2,6-hexanetriol, thiodiglycol, hexylene glycol, diethylene glycol and the like, glycerin; lower alkyl ethers of polyhydric alcohols such as ethylene glycol methyl (or ethyl) ether, diethylene glycol methyl (or ethyl) ether, triethylene glycol monomethyl (or ethyl) ether and the like; N-methyl-2-pyrrolidone, 1,3-dimethyl-2-imidazolidinone and so on.

In the present invention, the most preferable liquid medium composition comprises water and at least one of water-soluble organic solvents, said water-soluble solvent containing at least water-soluble high boiling organic solvent, for example, polyhydric alcohols such as ethylene glycol, propylene glycol, glycerin, etc. The amount of these liquid media employed may be such that the ratio of the above reactive disperse dye contained should be about 0.1 to 15% by weight when the liquid composition for printing is prepared.

The liquid composition of the present invention contains the essential components as described above and, otherwise it can contain various known dispersing agents, surfactants, viscosity controllers added therein, if necessary.

Important as the dispersing agents or surfactants which may be optionally added are anionic dispersing agents or surfactants such as fatty acid salts, alkylsulfate salts, alkylbenzenesulfonate salts, alkylnaphthalenesulfonate salts, dialkylsulfosuccinate salts, alkylphosphate salts, naphthalenesulfonic acid formalin condensates, polyoxyethylenealkylsulfate salts, etc.; nonionic dispersing agents or surfactants such as polyoxyethylene alkyo ether, polyoxyethylene alkylphenyl ether, polyoxyethylene fatty acid ester, sorbitan fatty acid ester, polyoxyethylene sorbitan fatty acid ester, polyoxyethylene alkylamine, glycerin fatty acid ester, oxyethyleneoxypropylene block copolymer, etc.

The viscosity controlling agent may preferably be primarily a water-soluble natural or synthetic polymer such as carboxymethyl cellulose, sodium polyacrylate, polyvinylpyrrolidone, gum arabic, starch, etc., and the viscosity of the liquid composition of the present invention is controlled to 50 cps or less, preferably 1 to 15 cps, at 25° C. with the use of or without use of these viscosity controlling agents.

In order to make up an ink to be used for the ink jet recording method in which ink is electrically charged, a specific resistance controlling agent composed of an inorganic salt is added such as lithium chloride, ammonium chloride, sodium chloride, etc.

When the liquid composition is to be applied for the ink jet system in which ink is discharged by the action of heat energy, thermal properties (e.g. specific heat, thermal expansion coefficient, thermal conductivity, etc.) may be sometimes controlled.

Further, other than the above three kinds of additives, it is also possible to add, for example, defoaming agents, penetration agents, antifungal agents, pH controllers, etc., if desired.

The liquid composition for ink jet printing of the present invention is generally obtained by mixing the essential components and the optical components as described above by a grinding means known in the art such as ball mill, sand mill, speed line mill, etc. to make the particle size of the dye generally to 30μm or less, preferably 20μm or less. If the particle size is too large, there may be caused the problems such as clogging of the ink jet nozzle, or incomplete level dyeing in the subsequent dye fixing treatment step. Also, when a liquid medium capable of dissolving the reactive disperse dye is selected as the liquid medium, the liquid composition of the present invention can be obtained by mere dissolving action such as heating, etc.

The liquid composition for printing of the present invention can be basically obtained as described above, but a further important point in the present invention is to control the liquid composition obtained by formulating the essential components and the optical components as described above to have a surface tension within the range from 35 to 60 dyne/cm. Control of the liquid composition to have such a surface tension can be accomplished by those skilled in the art with ease by selection of the reactive disperse dye, selection of the liquid medium and combination thereof and use of various additives.

In the liquid composition of the present invention, if its surface tension is less than 35 dyne/cm, the liquid composition applied to a woven or nonwoven fabric comprising various kinds of fibers will spread to cause excessive blurring of the liquid composition attached on its surface, whereby fine picture patterns can be formed with difficulty. On the other hand, if the surface tension exceeds the upper limit of the above range, stable and uniform droplets can be obtained with difficulty during discharging from the ink jet nozzle.

The value of the surface tension as mentioned above is measured by means of VISCONIC ELD (produced by Tokyo Keiki Co.) at 25° C.

In the present invention, it is very effective to adjust the content of polyvalent metals in the liquid composition to not higher than 100 ppm.

Such adjustment of polyvalent metal content can be accomplished by selection of the construction material of the apparatus for grinding the reactive disperse dye to be used in the present invention, by purification of the reactive disperse according to the known method or by use of distilled water or deionized water as the liquid medium.

The construction material of the grinding apparatus may preferably to alumina. The purification method may preferably the method in which the dye is extracted with an organic solvent or the method in which the dye is washed by suspending in a solvent in which polyvalent metals are soluble.

In the liquid composition of the present invention, if the content of polyvalent metals is higher than 100 ppm, clogging of the ink jet nozzle will frequently occur. Also, problems may also occur such as inferior discharging stability from the nozzle or dispersion stability of the dye, and further level dyeing on a cloth may become insufficient.

Further, it is also desirable to adjust pH to 3 to 7 in the liquid composition of the present invention.

Such adjustment of pH can be accomplished with ease by adding suitably a pH controller into the liquid composition. Basic controllers may preferably be NaOH, KOH, $Na_2CO_3, K_2CO_3$, triethanolamine, etc., while acidic controllers may preferably be acetic acid, hydrochloric acid, glycolic acid, etc.

In the liquid composition of the present invention, if its pH is lower than 3, there may sometimes occur corrosion or deterioration of the ink pathways, and also dispersion stability of the dye may be lowered. Further, if the pH is in the alkali region, the reaction may sometimes occur between the constituent material of the liquid composition and the dye, whereby the reaction with the cloth may be hindered.

The liquid composition as described in detail above is well fitted for the ink jet system and is also useful for printing woven fabrics or nonwoven fabrics, particularly mixed woven fabrics or mixed nonwoven fabrics comprising reactive fibers dyeable with reactive dyes such as cotton, hemp, viscose, wool, silk, nylon, etc. and non-reactive fibers dyeable with disperese dyes such as polyester fiber, acetate fiber, polypropylene fiber, vinylon fiber, etc. Although any of known woven fabrics or nonwoven fabrics can be used, in addition thereto, these woven fabrics or nonwoven fabrics applied with pretreatment for ink jet printing may also be available. Such pretreatment can be performed by imparting a water-soluble or water-dispersible polymer which can absorb or retain rapidly the liquid composition for printing imparted onto the surface of the fiber constituting the fabric.

The ink jet system employed for imparting the liquid composition of the present invention to the woven fabric, nonwoven fabric or molded product as described above may be any system, provided that it can release the liquid composition of the present invention effectively from the nozzle and impart it to the woven fabric or nonwoven fabric which is the target to be jetted against. Typical examples of such systems are described in, for example, IEEE Transactions on Industry Applications Vol. JA-13, No. 1 (Feb., March 1977); Nikkei Electronics No. 305 (Dec. 6, 1982). The systems described in these literatures can be preferably used for the liquid composition of the present invention. To describe about some of them, there is first an electrostatic attracting system. In this system, a strong electrical field is applied between a nozzle and an acceleration electrode placed several mm ahead of the nozzle, and the ink formed into particles from the nozzle is successively withdrawn and permitted to fly between deflecting electrodes, while giving information signals to the deflecting electrodes to effect recording; alternatively in another system, ink particles are jetted out corresponding to the information signals without deflection of ink particles. Either system may be applicable for the present invention.

In the second system, high pressure is applied by a midget pump on ink and the nozzle is vibrated mechanically by a quartz oscillator, etc., thereby jetting out forcibly minute ink particles, and the ink particles jetted out are electrically charged corresponding to information signals simultaneously with jetting. The charged ink particles are deflected corresponding to the amount of charges during passing through the deflecting electrode plates. Another system utilizing this system is the so called microdot ink jet system. According to this system, the ink pressure and excitation conditions are maintained at appropriate values within a certain limited range, two kinds of large and small droplets are generated from the tip of the nozzle, of which only the small droplets are utilized for recording. The specific feature of this system resides in enabling to obtain of a group of minute droplets even with a large nozzle opening of the prior art.

The third system is the piezoelectric device system. According to this system, as a means for pressurizing ink, instead of mechanical means employed in other systems, a piezoelectric device is used. By generating mechanical displacement by giving electrical signals to a piezoelectric device, pressure is applied to ink to jet it out of a nozzle.

The liquid composition of the present invention is also suitable for printing by an ink jet system according to the method disclosed in U.S. Pat. No. 4,410,899 in which the ink receiving action of heat energy undergoes abrupt change in volume accompanied with generation of bubbles, and the ink is discharged by pressurizing action due to the change.

Any of various ink jet systems as described above can be used, and picture patterns such as letter, figures, etc. with colored liquid composition are formed on cloths such as woven or nonwoven fabrics by employment of any of such systems. Since the colorant in the liquid composition of the present invention is not a mixture of a disperse dye and a water-soluble dye, but comprises a dye of a single component, the liquid composition of ink can be maintained always constant to enable uniform printing.

Accordingly, even after the subsequent dye fixing treatment such as alkali treatment or heating treatment, sharp and minute picture patterns can be formed. In contrast, when the ink for ink jet printing of the prior art is used, the problems in the apparatus as mentioned above were caused and also minute picture patterns were difficult to be formed on cloths due to inferior level dyeing characteristics.

As described above, by use of the liquid composition of the present invention, the liquid composition can be attached on a cloth corresponding exactly to the image signals. Since the reactive disperse dye in the liquid composition in this state is merely attached onto the cloth, it is preferably subjected to reactive fixation of the dye onto the fiber and removal of unfixed dye. Such reactive fixing and removal of unreacted dye can be performed according to a known method, for example, according to the treatment such as the steaming method, the HT steaming method, the thermofix method, the alkali pad steam method, the alkali blotch steam method, the alkali shock method, the alkali cold fix method, etc., followed by washing.

According to the present invention as described above, an expensive printing plate is not required as in general printing of the prior art, but the image to be printed can be prepared and modified with extreme ease by means of a computer, whereby it is possible to adapt the desired pattern at any time for the changes in fashion without employing expensive plates as in the prior art. Accordingly, it has the advantage of being applicable not only for industrial printing process but also for printing as a hobby in homes in general.

The present invention is described in more detail by referring to the following Examples, where parts and % are based on weight. In these Examples, the term ink has the same meaning as the liquid composition as mentioned above.

Example 1 (example of ink preparation)

| | |
|---|---|
| Dye of the above formula (2) | 5 Parts |
| Anionic surfactant (dispersing agent) | |

Example 1 (example of ink preparation) -continued

| | |
|---|---|
| (Demol N, produced by Kao Sekken K. K.) | 4 Parts |
| Ethylene glycol | 15 Parts |
| Diethylene glycol | 13 Parts |
| Water | 65 Parts |

After all of the above components were dispersed in a ball mill made of alumina for about 36 hours, the mixture was adjusted to pH 4.7 with acetic acid, and further dispersed in the ball mill made of alumina for 3 hours, followed by removal of coarse particles with particles sizes of 10 μm or more through Fluoropore Filter FP-1000 (produced by Sumitomo Denko K.K.), to provide an aqueous ink (A).

Example 2 (example of ink preparation)

| | |
|---|---|
| Dye of the above formula (7) | 4 Parts |
| Anionic surfactant (Nikkol OTP-100s, produced by Nikko Chemicals K. K.) | 0.05 Parts |
| Anionic surfactant (Demol N, produced by Kao Sekken K. K.) | 1.5 Parts |
| Nonionic surfactant (Emulgen 981, produced by Kao Sekken K. K.) | 0.2 Parts |
| Isopropyl alcohol | 0.5 Parts |
| Propylene glycol | 15 Parts |
| Polyethylene glycol 400 | 5 Parts |
| Water | 75 Parts |

After all of the above components were dispersed in a ball mill made of alumina for about 40 hours, the mixture was adjusted to pH 5.6 with acetic acid, and further dispersed in the ball mill made of alumina for 2 hours, followed by removal of coarse particles with particles sizes of 5 μm or more through Fluoropore Filter EP-500 (produced by Sumitomo Denko K.K.), to provide an aqueous ink (B).

Example 3 (example of ink preparation)

| | |
|---|---|
| Dye of the above formula (14) | 7 Parts |
| Dye of the above formula (15) | 2 Parts |
| Nonionic surfactant (Emulgen 707, produced by Kao Sekken K. K.) | 1.5 Parts |
| Nonionic surfactant (Leodol TW-P120, produced by Kao Sekken K. K.) | 2.0 Parts |
| Ethylcarbitol | 20 Parts |
| Water | 70 Parts |

From all of the above components, an aqueous ink (C) was obtained in the same manner as Example 2.

Example 4 (example of ink preparation)

| | |
|---|---|
| Dye of the above formula (9) | 6 Parts |
| Anionic surfactant (Ionet D-2, produced by Sanyo Kasei Kogyo K. K.) | 5.5 Parts |
| Ethylene glycol | 25 Parts |
| Glycerin | 5 Parts |
| 1,3-Dimethylimidazolidinone | 5 Parts |
| Water | 60 Parts |

From all of the above components, an aqueous ink (D) was obtained in the same manner as Example 1.

Comparative example 1 (example of ink preparation)

In place of the reactive disperse dye in Example 1, 3 parts of C.I. Disperse Blue 3 and 2 parts of Reactive Blue 49 were employed, following otherwise the same procedure as Example 1, to obtain an ink (E) for comparative purpose.

COMPARATIVE EXAMPLE 2 (EXAMPLE OF INK PREPARATION)

In place of the reactive disperse dye in Example 2, 2 parts of C.I. Disperse Red 54 and 2 parts of Reactive Red 22 were employed, following otherwise the same procedure as Example 2, to obtain an ink (F) for comparative purpose.

The properties of the ink obtained in Examples 1 to 4 and Comparative examples 1 and 2 are shown in Table 1 shown below.

TABLE 1

| | Example | | | | Comparative example | |
|---|---|---|---|---|---|---|
| | Ink (A) | Ink (B) | Ink (C) | Ink (D) | Ink (E) | Ink (F) |
| Surface tension (dyne/cm) | 45 | 37 | 42 | 57 | 25 | 62 |
| pH | 4.7 | 5.6 | 5.6 | 4.7 | 2.5 | 11.2 |
| Polyvalent metal content (ppm)*1 | 78 | 53 | 60 | 18 | 80 | 62 |

*1 Results of analysis by ICP (Induction Combined Emission Spectroanalyzer) are shown.

EXAMPLE 5

The respective aqueous inks (A–F) of Examples 1 to 4 and Comparative examples 1 and 2 were applied for an ink jet printer utilizing heat energy according to the method as disclosed in U.S. Pat. No. 4,410,899 for printing of various mixed woven fabrics, followed by heat treatment at 180° C. for 90 second. Further, in an alkali bath prepared with sodium carbonate and potassium chloride, dyeing was performed at 90° C. for 20 seconds, followed by washing with a neutral detergent, to obtain printed products. The results are shown in Tale 2.

TABLE 2

| | | Cloth | Blurr | Variance in dot size |
|---|---|---|---|---|
| Example | | | | |
| Ink | (A) | Cotton 100% (georgette) | O | O |
| Ink | (B) | Polyester 65%, Cotton 35% (broad) | O | O |
| Ink | (C) | Polyester 50%, Cotton 50% (broad) | O | O |
| Ink | (D) | Wool 100% (Taffeta) | O | O |
| Comparative example | | | | |
| Ink | (E) | Cotton 100% (georgette) | X | X |

TABLE 2-continued

| | | Cloth | Blurr | Variance in dot size |
|---|---|---|---|---|
| Ink | (F) | Cotton 100% (georgette) | O | X |

*1 Sharpness of fine line (width: about 1 mm) of printed product was judged by visual observation. O: Good X: Bad
*2 Dots were printed in an array of 30 cm at 1 mm intervals and variance of dots was judged by visual observation. O: Good X: Bad

EXAMPLE 6

The respective aqueous inks (A-E) of Examples 1 to 4 and Comparative example 1 were mounted on (1) an ink jet printer utilizing heat energy according to the method disclosed in U.S. Pat. No. 4,410,899 (size of nozzle : 40×50 μ) and (2) an ink jet printer PJ-1080A utilizing a piezoelectric device (produced by Canon K.K., nozzle diameter 65 μ), and continuous printing of 10 dots was performed by means of 10 nozzles on a broad fabric comprising 65% polyester and 35% cotton. Also, the respective aqueous inks (A-E) were placed in glass bottles of 100 cc and stored therein at 40° C. for one week for evaluation of storage stability of ink. The results are shown in the Table 3 shown below.

The aqueous inks (A-D) of Examples 1 to 4 were mounted on an ink jet printer PJ-1080A utilizing a piezoelectric device (produced by Canon K.K., nozzle diameter : 65 μ), and printing was effected on a broad fabric comprising 65% polyester and 35% cotton, and thereafter heat treatment was applied on the printed fabric at 180° C. for 90 seconds, followed by fixing by treatment in an alkali bath prepared with sodium carbonate at 90° C. for 20 seconds. After washing with a neutral detergent and drying, sharp printed products were obtained.

TABLE 3

| | Example | | | | Comparative example |
|---|---|---|---|---|---|
| | Ink (A) | Ink (B) | Ink (C) | Ink (D) | Ink (E) |
| *1 Clogging Printer (1) | 0 | 0 | 1 | 0 | 9 |
| Printer (2) | 0 | 0 | 0 | 0 | 9 |
| *2 Storage stability | | | | | X |

*1 Number of nozzles causing clogging when 10 dots were each continuously printed by 10 nozzles in the printer of each system.
*2 After storage of ink at 40° C. for one week, generation of foreign matter was judged by visual observation. : No foreign matter X : Foreign matter generated

We claim:

1. An ink jet printing method comprising the steps of: applying a liquid composition onto a mixed woven or non-woven fabric of a reactive fiber and a non-reactive fiber according to an ink jet system; and then subjecting the fabric to a dye fixing treatment, said liquid composition consisting essentially of a dye which is dispersed or dissolved in an aqueous liquid medium, said dye comprising (i) neither sulfonic acid nor carboxylic groups, and (ii) at least one of the groups selected from ethyleneimine, azide, sulfonethyleneimine, dichlorotriazine, monochlorotriazine, trichloropyrimidine, monochlorodifluoropyrimidine, chlorobenzothiazole, dichloropyridazone, dichloropyridazine, dichloroguinoxaline, epoxy, 3-carboxypyridiniotriazine, $-SO_2CH_2CH_2OSO_3H$, $-SO_2NHCH_2CH_2OSO_3H$, $-NHCH_2CH_2OSO_3H$, $-NHCOCH_2CH_2Cl$, $-NHCOCH=CH_2$, $-SO_2CH=CH_2$, $-CH_2NHCOCCl=CH_2$, $NHCH_2OH$, $-PO_3H_2$, $-SO_2CH_2CH_2OCOCH_3$ and $-SO_2CH_2CH_2OCOOC_4H_9$.

2. An ink jet printing method according to claim 1, wherein the liquid composition contains 0.1 to 15% by weight of the reactive disperse dye.

3. An ink jet printing method according to claim 1, wherein the aqueous liquid medium comprises a mixture of water with a water-soluble organic solvent.

4. An ink jet printing method according to claim 11, wherein the liquid composition has a viscosity of 50 cps or less at 25° C.

5. An ink jet printing method according to claim 1, wherein the reactive disperse dye has a particle size of 30 μm or less.

6. An ink jet printing method according to claim 1, wherein the liquid composition is adjusted to have a surface tension of 35 to 60 dyne/cm.

7. An ink jet printing method according to claim 1, wherein the liquid composition is adjusted to have a pH of 3 to 7.

8. An ink jet printing method according to claim 1, wherein the liquid composition contains a polyvalent metal at a concentration of 100 ppm or less.

9. An ink jet method according to claim 1, wherein said reactive fiber can be dyed with a reactive dye and said non-reactive fiber can be dyed by a disperse dye.

* * * * *

UNITED STATES PATENT AND TRADEMARK OFFICE
CERTIFICATE OF CORRECTION

PATENT NO. : 4,969,951
DATED : November 13, 1990
INVENTOR(S) : Shoji Koike et al.

It is certified that error appears in the above-identified patent and that said Letters Patent is hereby corrected as shown below:

COLUMN 1:

Line 7, "May 6, 1986," should be --May 16, 1986,--.

Line 61, "charactersizes" should be --characterizes--.

COLUMN 4:

Line 63, "preferably" should read --preferably be--.

COLUMN 6:

Line 51, "to" should read --be--.

Line 52, "preferably" should read --preferably be--.

COLUMN 10:

Line 12, "Comparative example 1 (example of ink preparation)" should read --COMPARATIVE EXAMPLE 1 (EXAMPLE OF INK PREPARATION)--.

Line 49, "90 second." should read --90 seconds.--.

Line 53, "Tale" should read --Table--.

UNITED STATES PATENT AND TRADEMARK OFFICE
CERTIFICATE OF CORRECTION

PATENT NO. : 4,969,951

DATED : November 13, 1990

INVENTOR(S) : Shoji Koike et al.

It is certified that error appears in the above-identified patent and that said Letters Patent is hereby corrected as shown below:

COLUMN 12:

Line 20, "dichloroquinox-" should read --dichloroquinox--.

Line 24, " $-NHCOCH = CH_2, -SO_2CH = CH_2$" should read -- $-NHCOCH = CH_2, -SO_2CH = CH_2$--.

Line 25, " $-CH_2NHCOCCl=CH_2, NHCH_2OH,$" should read -- $-CH_2NHCOCCl=CH_2, -NHCH_2OH,$--.

Line 48, "ink jet method" should read --ink jet printing method--.

Signed and Sealed this

Twelfth Day of January, 1993

Attest:

DOUGLAS B. COMER

Attesting Officer     Acting Commissioner of Patents and Trademarks